(12) United States Patent
Al-Jlil

(10) Patent No.: US 8,496,832 B2  
(45) Date of Patent: Jul. 30, 2013

(54) METHOD FOR SEWAGE AND INDUSTRIAL WASTEWATER TREATMENT

(75) Inventor: Saad A. Al-Jlil, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 373 days.

(21) Appl. No.: 12/968,795

(22) Filed: Dec. 15, 2010

(65) Prior Publication Data

US 2012/0152838 A1   Jun. 21, 2012

(51) Int. Cl.  
*B01D 15/02* (2006.01)  
*B63J 4/00* (2006.01)  
*B01D 3/00* (2006.01)

(52) U.S. Cl.  
USPC ........... 210/640; 210/660; 210/679; 210/774; 210/786; 210/766; 203/10; 203/39; 203/99

(58) Field of Classification Search  
None  
See application file for complete search history.

(56) References Cited

U.S. PATENT DOCUMENTS

| | | | |
|---|---|---|---|
| 4,518,503 A * | 5/1985 | Fermaglich | 210/662 |
| 4,765,908 A | 8/1988 | Monick et al. | |
| 4,828,692 A * | 5/1989 | Peranio | 210/123 |
| 4,956,093 A | 9/1990 | Pirbazari et al. | |
| 7,678,268 B2 | 3/2010 | Smith et al. | |

* cited by examiner

*Primary Examiner* — Katherine Zalasky  
(74) *Attorney, Agent, or Firm* — Andrew M. Calderon; Roberts Mlotkowski Safran & Cole P.C.

(57) ABSTRACT

A process for wastewater treatment, comprising aerating and mixing wastewater containing organic and/or inorganic pollutants and bentonite clay in a vessel at a first temperature and for a time sufficient to reduce the concentration of said pollutants, raising the temperature of said mixture to at least 100° C. to evaporate water vapor, passing said water vapor through a fritted membrane and into a condenser, and collecting condensed water.

18 Claims, 1 Drawing Sheet

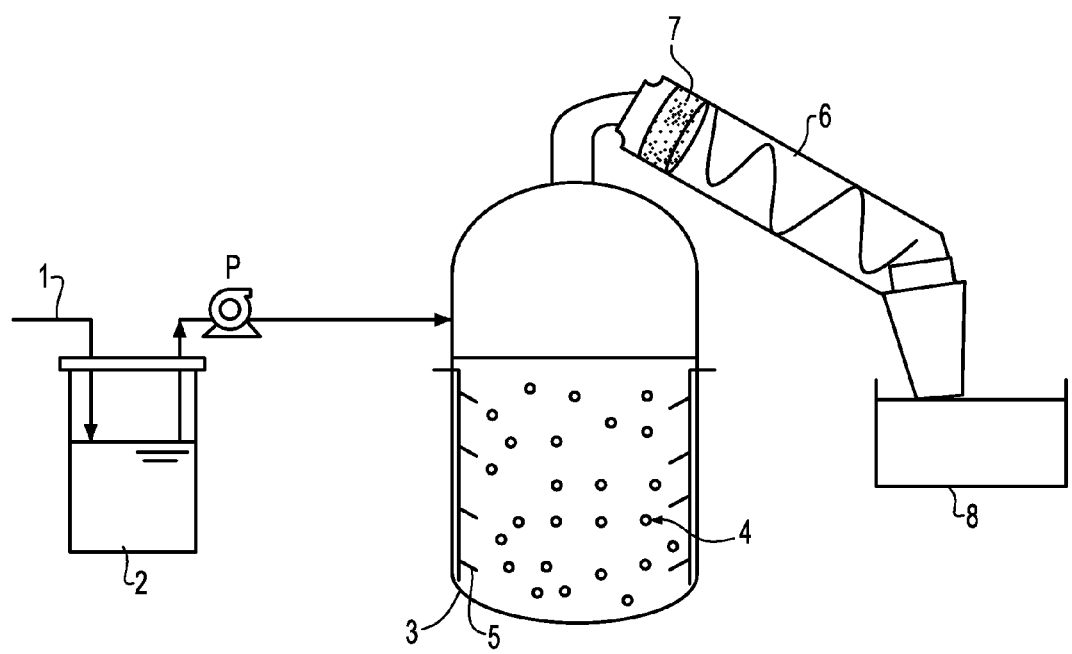

METHOD FOR SEWAGE AND INDUSTRIAL WASTEWATER TREATMENT

FIELD OF THE INVENTION

The invention relates to a process for treating sewage and industrial wastewater to reduce or eliminate bacteria, organic and/or inorganic pollutants.

BACKGROUND OF THE INVENTION

In the area of water treatment, such as sewage or industrial waste water treatment, there is an ever-increasing need to remove undesirable and even toxic contaminants, such as bacteria and chemicals from water such that it can be used for the development of landscape and industrial cooling processes.

Presently various technologies in use for reducing various types of pollutants from wastewater are filtration and biological treatment, bioreactor membranes, reverse osmosis and nano-filtration membranes. However, these technologies are quite expensive and time consuming and often require pretreatment of wastewater prior to the cleanup treatment, especially reverse osmosis and nano-filtration, in which processes a great deal of concentrated wastewater is rejected, requiring other disposal methods.

U.S. Pat. No. 4,765,908 to Monick et al., incorporated by reference herein, discloses a treatment composition and method for removing a plurality of contaminants from a wastewater system in the form of a non-leachable sludge. The treatment composition comprises an alkali or alkaline carbonate; activated montmorillonite; a catalyst, such as zirconium and polyelectrolyte; one or more flocculants, such as a metal salt and calcium oxide, lime, or calcium hydroxide; and bentonite. Additionally, the treatment composition may contain soda ash, lignite, and activated carbon. The treatment composition is introduced and mixed with the wastewater, which is then filtered to produce a sludge containing the contaminants in a non-leachable form.

U.S. Pat. No. 4,956,093 to Pirbazari et al., incorporated by reference herein, discloses a wastewater treatment system in which biologically active particulate material mixed with wastewater is recirculated under turbulent conditions. The biomass is maintained at high concentration, and recirculation of the particles maintains the biological layer on the particles at a more active and efficient state would be the case without such recirculation. The system is particularly efficient, especially when the organic waste materials are slowly or relatively non-biodegradable, when the particulate material is adsorptive (as, for example are particles of activated carbon) and the recirculation system includes an ultrafilter. When combined with a pretreatment of either alum or ferric chloride with lime, the system is particularly suited for efficient and effective treatment of dairy wastes.

U.S. Pat. No. 7,678,268 to Smith et al., incorporated by reference herein, discloses a method and apparatus for treating wastewater. The wastewater treatment system includes a bioreactor including activated carbon and a first biological population. The wastewater treatment system may also include a membrane bioreactor and/or a wet oxidation unit.

However, none of the above-discussed references discloses or suggests a cost effective and time efficient method for reducing both bacterial and chemical pollutants from sewage-containing wastewaters or industrial wastewaters. Accordingly, there exists a need in the art to overcome the deficiencies and limitations described hereinabove.

SUMMARY OF THE INVENTION

In a first embodiment, the invention is directed to a process for wastewater treatment, comprising aerating and mixing wastewater containing organic and/or inorganic pollutants and bentonite clay in a vessel at a first temperature and for a time sufficient to reduce the concentration of said pollutants, raising the temperature of said mixture to at least 100° C. to evaporate water vapor, passing said water vapor through a fritted membrane and into a condenser, and collecting condensed water.

In another embodiment, the invention is directed to a process for reducing pollutants in wastewater, comprising aerating and mixing wastewater containing organic and/or inorganic chemical pollutants and bentonite clay in a vessel at a first temperature and for a time sufficient to reduce the concentration of said pollutants, raising the temperature of said mixture to at least 100° C. to evaporate water vapor, passing said water vapor through a fritted membrane and into a condenser, and collecting condensed water.

BRIEF DESCRIPTION OF THE DRAWINGS

The present invention is described in the detailed description which follows, in reference to the noted plurality of drawings by way of non-limiting examples of exemplary embodiments of the present invention.

FIG. shows an apparatus suitable for practicing the present invention.

DETAILED DESCRIPTION OF THE INVENTION

As discussed above, conventional treatment methods for sewage-containing and/or industrial wastewaters are often expensive and time consuming. In comparison, the presently disclosed innovative process is a cost effective and time efficient method for reducing the concentration of typical pollutants in wastewaters, such as bacteria, chemicals (both organic and inorganic), metal cations, such as alkali and/or alkaline earth cations, heavy metals, sulfates, nitrates and other such anions.

The presently disclosed process can be conducted with readily available, natural adsorbents, such as bentonite clays, and can be conducted in as little as a few hours, while leaving no untreated wastewater to be disposed of by other methods. It is unnecessary to use additional conventional water treatment components such as catalysts, flocculants, lime, calcium hydroxide, calcium oxide, and the like, nor even to pretreat the wastewater with a biologically active biomass in order to practice the presently disclosed treatment process. As such, the presently disclosed treatment process consists essentially of aeration of wastewater followed by or in combination with mixing with bentonite clay, at temperatures below 100° C., in the absence of such conventional water treatment components, as set forth above, and subsequently evaporating water vapor from the mixture at about 100° C., passing the water vapor through a fritted membrane and into a condenser, so as to condense and collect treated water.

The present inventor has found that the concentration of biodegradable organic materials, as measured by biochemical oxygen demand (BOD), and/or chemical pollutants, as measured by chemical oxygen demand (COD), in wastewater can be reduced by at least about 40%, even at least about 70%, or even at least about 75%, and even at least about 93%, depending on the pollutant, by the simple steps of aeration, mixing (i.e. stirring or agitation) and combining the wastewater with common bentonite clays under certain disclosed conditions of temperature and time.

The present inventor has found that the Hetrophelic Plate Count (HPC) of bacteria, as measured by Idexx Technique in the form of MPN (Most Probable Number), in wastewater can be reduced by at least about 95%, even about 100%, depending on the pollutant, by the simple steps of aeration, mixing (i.e. stirring or agitation) and combining the wastewater with common bentonite clays under certain disclosed conditions of temperature and time and without using a chlorination step.

The fritted membrane that is used in the present examples is a Bibby sterilin, 40 mm Pyrex® sintered disc, with porosity=17% (grade No. 3) and pore index between 16 microns and 40 microns (available from Bibby sterilin Ltd stone, staffs, St 15 OSA, England).

Pyrex® borosilicate glass disc membranes have good chemical and thermal characteristics. Pyrex® borosilicate glass has a good chemical resistance to attack from acids, halogens, salt solutions and organic solvents. Also, Pyrex® has good thermal properties as a result of its low expansion coefficient and high softening point.

However, the fritted membranes suitable for use with the present invention can also be made from other materials, for example ceramic materials, such as alumina, silica or the like in combination with a binder, or even from other glasses, so long as the final fritted membrane has a porosity close that of those disclosed above.

Bentonite clays are well known in the art and readily available in Saudi Arabia.

The adsorbent used in the experiments was Saudi natural bentonite clay (without treatment) obtained from Khulays Mine, which is located in the village of Khulays, 95 kilometers south of Jeddah in Saudi Arabia. Natural clays usually consist of mixtures of minerals consisting of the oxides of silica and alumina. For example, bentonite clay is a mineral clay containing montmorillonite as the major mineral in its structure with small amounts of other minerals, such as kaolinite and illite [Grim, R. E., "Clay mineralogy", McGraw-Hill, New York, (1968)]. Montmorillonite is the only mineral in the mixture that can expand and is expected to do most of the adsorption. Mineralogical analysis shows that this Saudi bentonite consists of 80% montmorillonite as a minimum, 10% kaolinite and 10% combined illite and quartz as a maximum. The results of the analysis by XRF method are shown below. Mineralogical analysis was accomplished by x-ray diffraction (XRD). The specific pore volume, solid particle density and porosity values are equal to 0.0778 cm$^3$/g, 2.6253 g/cm$^3$ and 0.17, respectively. These values were measured by Micromeritics Material Analysis Laboratory (Norcross, Ga., U.S.A.) using the gas pycnometry method (Accupc 1330 pycnometer). The chemical analysis of Saudi bentonite clay is as shown below.

| Chemical analysis of Saudi bentonite clay by XRF (wt %) | |
| --- | --- |
| Compound | wt % in Clay |
| $SiO_2$ | 55.0 ± 3.0 |
| $Al_2O_3$ | 22.0 ± 2.0 |
| TiO2 | 1.5 ± 0.25 |
| $Fe_2O_3$ | 5.67 ± 0.5 |
| MgO | 2.30 ± 0.45 |
| CaO | <2.00 |
| $Na_2O$ | <2.00 |
| $K_2O$ | <1.00 |
| $P_2O_5$ | <0.20 |
| $SO^-_3$ | 0.002 |
| $Cl^-$ | 0.2 |
| $Cr_2O_3$ | 0.02 |
| $Mn_2O_3$ | 0.03 |
| Loss On Ignition | 9.80 |

According to the present invention, polluted wastewater is optionally first filtered or strained to remove large solids, then passed into a vessel for treatment by aeration, wherein air is introduced into the wastewater by such as a sparger, and vigorously mixed/stirred for a period of at least about one half hour, preferably for an hour or more, and at a temperature ranging from about ambient to about 70° C. A quantity of bentonite clay is added to the wastewater, either simultaneously with, or separated in time from its introduction into the vessel and the mixture of wastewater and bentonite clay is subjected to said mixing/stirring and aeration for the above discussed time period.

During this period, the bentonite clay acts to adsorb both bacteria and chemical pollutants of low volatility, while highly volatile chemical pollutants are exhausted from the top of the vessel. Subsequently, the temperature of the mixture is raised to a second temperature below that of the boiling point of water, that is, below 100° C., while mixing and aeration are continued to drive off less volatile chemical pollutants from the vessel. This higher temperature, which can be as high as 70° C. is maintained for another period of time, such as for about one half hour, or even one hour or more, to provide adequate time for removal of the lesser volatile organic chemicals and further adsorption reactions of the bentonite clay with bacteria and low volatility chemical pollutants in the wastewater.

After the adsorption/aeration treatment, the temperature of the mixture is raised to at least about 100° C. to cause evaporation of water vapor from the mixture. The water vapor is passed, under its own pressure through a fitted membrane, and into a condenser so as to condense purified water, and the purified water is collected in a clean vessel. We have found that passing the water vapor through the fritted membrane in combination with the adsorption and aeration steps, acts to exclude any residual volatile chemicals and even acts to reduce residual bacterial contamination, with much greater efficiency than a conventional distillation process.

EXAMPLES

In the examples below, the following abbreviations and their corresponding test methods are used.

"BOD" means biochemical oxygen demand and is tested by determining the concentration of biodegradable organics (biodegradable organic materials) in wastewater by using a HACH BOD TRAK II and a Fisher Scientific low temperature incubator. BOD is an indirect measurement of biodegradable organic material. This test determines the amount of organic material in wastewater by measuring the oxygen consumed by microorganisms in biodegrading organic constitutions of the waste. The test consists of measuring oxygen demand before and after a 5-days incubation period of the sample at 20° C. to determine the amount of oxygen used biochemically. BOD is defined as the amount of oxygen (in mg) required by aerobic bacteria to decompose the biodegradable organic material in 1 liter of an effluent.

"COD" means chemical oxygen demand and is tested by oxidation of organic and inorganic waste by using a HANNA Instrument HI 839800 Reactor and HACH 3000 Spectrophotometer.

"TC" means total carbons and is tested by a TOC analyzer, made by Shimadzu, Japan.

"TOC" means total organic carbons and is tested by a TOC Analyzer, made by Shimadzu, Japan.

"IC" means inorganic carbons and is tested by a TOC Analyzer, made by Shimadzu, Japan.

Alkali and alkaline earth cations, such as Ca, Mg, Na, K, and the heavy metal cations (Fe, Ni, Cr, Zn, Co, Pb and Mo) are tested by an ICP 2000 DV, USA.

Anions such as $HCO_3$, $SO_4$ and $NO_3$ are tested by Ion Chromatography with a Dionex 300 ion chromatograph, Japan.

Bacteria are tested by Idexx Technique, USA.

Example 1

As illustrated in the FIGURE, wastewater 1 containing contaminant levels as set forth in the tables below, was pumped into a tank 2 through a screen to remove solid materials. 1000 mL of the raw wastewater from the tank was then passed through pump P into an evaporator vessel 3, mixed with 10 g bentonite clay 4, and the mixture was aerated with spargers 5 and stirring for a period of one hour at ambient temperature to reduce the BOD. Then the temperature of the mixture was increased to 70° C., and stirring and aeration was continued for another one half hour to allow the volatile materials to escape from the system, thus reducing COD. Subsequently, a condenser apparatus 6, containing a Pyrex® disc membrane 7 was placed on top of the evaporator vessel, and the temperature in the evaporator vessel was raised to 100° C., without aeration. Water vapor was evaporated from the wastewater/bentonite mixture and passed through the Pyrex® disc membrane under its own pressure, condensed and collected in a clean tank 8. Results of the process are set forth in Table 1, below.

TABLE 1

| Analysis | Concentration before treatment (mg/L) | Concentration after treatment (mg/L) | % removal |
|---|---|---|---|
| BOD | 211 | 53 | 74.9 |
| COD | 79 | 17 | 78.5 |
| TC | 185.8 | 15.2 | 91.82 |
| TOC | 74.85 | 2.05 | 97.3 |
| IC | 111 | 13.7 | 87.7 |
| $HCO_3$ | 156 | 16 | 89.74 |
| Ca | 140 | 1.6 | 98.9 |
| Mg | 32 | 1.2 | 96.3 |
| Na | 179 | 7.1 | 96 |
| K | 10 | 1.1 | 89 |
| Cl | 382 | 5.6 | 98.53 |
| $SO_4$ | 192 | 3.2 | 98.33 |
| $NO_3$ | 19 | 1.7 | 91.1 |
| Fe | 45 | ND* | 100 |
| Ni | 10 | 3 | 70 |
| Cr | 2 | ND* | 100 |

*Not Detectable

Example 2

The second example was conducted in the same manner as in Example 1, except that the aeration time at ambient temperature was increased from 1 to 2 hours. The results of the treatment process are set forth in Table 2, below. (Note: raw wastewater volume=1000 ml).

TABLE 2

| Analysis | Concentration before treatment (mg/L) | Concentration after treatment (mg/L) | % removal |
|---|---|---|---|
| BOD | 198 | 56 | 72 |
| COD | 91 | 6 | 93.4 |
| TC | 106.9 | 10.53 | 90.2 |
| TOC | 39.53 | 1.31 | 96.7 |
| IC | 67.42 | 9.23 | 86.3 |
| $HCO_3$ | 168 | 32 | 81 |
| Ca | 137 | 7.9 | 94.2 |
| Mg | 14 | 0.35 | 97.5 |
| Na | 197 | 8.4 | 95.73 |
| K | 6.9 | 0.31 | 95.5 |
| Cl | 328 | 5 | 98.5 |
| $SO_4$ | 131 | 4 | 97 |
| $NO_3$ | 118 | 1.8 | 98.5 |

It is observed from the results that the COD reduction was significant and the removal efficiency increased from 78.5% to 93.4%, as compared to Example 1.

Example 3

The third example was conducted essentially in the same manner as in Example 1, except that 20 g of bentonite clay was used. The results of the treatment process are set forth in Table 3, below. (Note: raw wastewater volume=1000 ml).

TABLE 3

| Analysis | Concentration before treatment (mg/L) | Concentration after treatment (mg/L) | % removal |
|---|---|---|---|
| BOD | 261 | 44 | 83.2 |
| COD | 59 | 34 | 42.4 |
| TC | 116.7 | 4.19 | 96.4 |
| TOC | 40.07 | 1.30 | 96.8 |
| IC | 76.62 | 2.89 | 96.2 |
| $HCO_3$ | 172 | 13 | 92.2 |
| Ca | 140 | 1.9 | 98.6 |
| Mg | 24 | 0.32 | 98.7 |
| Na | 176 | 4.6 | 97.4 |
| K | 5 | 0.2 | 96 |
| Cl | 296 | 1.9 | 99.4 |
| $SO_4$ | 164 | 0.8 | 99.5 |
| $NO_3$ | 127 | 1.7 | 98.7 |

It is observed from the results that the BOD reduction was significant and the removal efficiency increased from 74.9% to 83.2%, as compared to Example 1. However, there was no significant change in reductions of cations and anions.

Example 4

The fourth example was conducted with 10 g of bentonite clay and by increasing total aeration time to 2 hours, except that the wastewater was first passed into the evaporation vessel and mixed by aeration for one hour at ambient temperature, and then the bentonite clay was added and the mixture was stirred for an additional hour at ambient temperature. The remainder of the treatment was conducted essentially in the same manner as in Example 1. The results of the treatment process are set forth in Table 4, below. (Note: raw wastewater volume=1000 ml).

TABLE 4

| Analysis | Concentration before treatment (mg/L) | Concentration after treatment (mg/L) | % removal |
|---|---|---|---|
| BOD | 75 | 35 | 53.3 |
| COD | 45 | 11 | 75.6 |
| TC | 143.3 | 71.1 | 50.4 |
| TOC | 16.1 | 6.5 | 59.6 |
| IC | 127.2 | 64.6 | 49.2 |
| $HCO_3$ | 164 | 32 | 80.5 |
| Ca | 142 | 13 | 90.8 |
| Mg | 39 | 4 | 89.7 |
| Na | 187 | 18 | 90.4 |
| K | 35 | 1.6 | 95.4 |
| Cl | 352 | 32 | 90.9 |
| $SO_4$ | 289 | 13 | 95.5 |
| $NO_3$ | 41 | 1.9 | 95.4 |

| Heavy metals | Concentration before treatment (µg/L) | Concentration after treatment (µg/L) | % removal |
|---|---|---|---|
| Co | 8.7 | 2.2 | 74.7 |
| Fe | 113.6 | 32.3 | 71.6 |
| Cu | 12.8 | 2.8 | 78.1 |
| Sr | 2365 | 346 | 85.4 |
| Mn | 7.3 | 1.1 | 84.9 |
| Cr | 15.3 | 3.7 | 75.8 |
| Zn | 38.9 | 8.7 | 77.6 |

It is observed from the results that there was no significant change in reductions of the COD and BOD as compared to Example 1.

Example 5

The fifth example was conducted essentially in the same manner as in Example 4, except that 2000 ml of raw wastewater was used. The results of the treatment process are set forth in Table 5, below.

TABLE 5

| Analysis | Concentration before treatment (mg/L) | Concentration after treatment (mg/L) | % removal |
|---|---|---|---|
| BOD | 180 | 52 | 71.11 |
| COD | 36 | Nil | 100 |
| TC | 144.4 | 65.68 | 54.52 |
| TOC | 29.36 | 7.025 | 76.07 |
| IC | 115.1 | 58.65 | 49.04 |
| $HCO_3$ | 200 | 4 | 98 |
| Ca | 148 | 0.86 | 99.42 |
| Mg | 40 | 0.75 | 98.13 |
| Na | 178 | 1.4 | 99.21 |
| K | 39 | ND* | 100 |
| Cl | 353 | 0.6 | 99.83 |
| $SO_4$ | 268 | 0.3 | 99.89 |
| $NO_3$ | 42 | ND* | 100 |

| Heavy metals | Concentration before treatment (µg/L) | Concentration after treatment (µg/L) | % removal |
|---|---|---|---|
| Ni | 202.9 | ND* | 100 |
| Fe | 1941 | ND* | 100 |
| Co | 13.73 | 0.055 | 99.59 |
| Cu | 103 | ND* | 100 |
| Sr | 1077 | ND* | 100 |
| Mn | 103.8 | 1.12 | 98.92 |
| Cr | 17.95 | ND* | 100 |

*Not Detectable

It is observed from the results that the COD reduction was significant and the removal efficiency increased from 78.5% to 100%, as compared to Example 1.

Comparative Example

In order to demonstrate the advantageous effects of the present invention, the presently disclosed process was compared to a conventional distillation of wastewater. The results are set forth in Tables 6 and 7 below.

TABLE 6

| Process | BOD before treatment (mg/L) | BOD after treatment (mg/L) | % removal |
|---|---|---|---|
| Conventional distillation | 40 | 38 | 5 |
| Example 2 | 198 | 56 | 72 |

TABLE 7

| Process | TOC before treatment (mg/L) | TOC after treatment (mg/L) | % removal |
|---|---|---|---|
| Conventional distillation | 13.82 | 13.63 | 1.37 |
| Example 2 | 39.53 | 1.31 | 96.7 |

As demonstrated by the data above, conventional distillation processes cannot be expected to provide equivalent clean-up of wastewater, as compared to the presently disclosed process.

The main advantage of the presently disclosed process is that it will remove the hazardous metals, reduce BOD and COD, bacteria, cations and anions from waste effluents originating from different industrial and domestic sources. The product water is suitable for uses such as landscape irrigation and industrial cooling processes and the like. Additionally, if the treated water is intended for land disposal, the associated environmental hazards will be minimized. Above all, this new innovative method of waste effluent treatment is cost effective as it can be conducted using solar energy and local materials (such as for the production of the Pyrex® or ceramic membrane and the adsorbent), and is effective to reduce BOD, COD, bacteria, cations, anions and heavy metals from wastewater.

Additionally, the presently disclosed method can be easily applied in small communities where wastewater production is relatively low, and large, conventional wastewater treatment facilities are not cost effective.

The foregoing examples have been provided for the purpose of explanation and should not be construed as limiting the present invention. While the present invention has been described with reference to an exemplary embodiment, changes may be made within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A process for wastewater treatment, comprising aerating and mixing wastewater containing organic and/or inorganic pollutants and bentonite clay in a vessel at a first temperature and for a time sufficient to reduce the concentration of said pollutants, raising the temperature of said mixture to at least 100° C. to evaporate water vapor, passing said water vapor through a fritted membrane and into a condenser; and collecting condensed water.

2. The process of claim 1, wherein said bentonite clay is added to said vessel after aerating and mixing said wastewater and said first temperature is ambient temperature.

3. The process of claim 1, wherein said first temperature is between about ambient temperature and 70° C., and said time is between about 0.5 and 2 hours.

4. The process of claim 1, wherein said pollutants which are reduced in concentration include volatile organic compounds.

5. The process of claim 4, wherein said pollutants further comprise bacteria.

6. The process of claim 2, wherein said wastewater is mixed and aerated for about 1 hour prior to addition of said bentonite clay, and the resulting mixture is mixed and aerated for an additional hour at ambient temperature, prior to evaporating said water vapor.

7. The process of claim 1, wherein said wastewater and said bentonite clay are added simultaneously to said vessel and are mixed and aerated at ambient temperature for at least about 1 hour, and at a second temperature of about 70° C. for about one half hour, prior to evaporating said water vapor.

8. The process of claim 1, wherein said wastewater and said bentonite clay are added simultaneously and are mixed and aerated at ambient temperature for about two hours.

9. A process for reducing pollutants in wastewater, comprising aerating and mixing wastewater containing organic and/or inorganic chemical pollutants and bentonite clay in a vessel at a first temperature and for a time sufficient to reduce the concentration of said pollutants, raising the temperature of said mixture to at least 100° C. to evaporate water vapor, passing said water vapor through a fritted membrane and into a condenser; and collecting condensed water, wherein said pollutants include one or more of volatile organic compounds, bacteria, heavy metals, alkali and/or alkaline earth cations, nitrates, sulfates, and chlorine.

10. The process of claim 9, wherein the Hetrophelic Plate Count (HPC) of bacteria is reduced by at least about 95%, as measured by Idexx Technique in the form of MPN.

11. The process of claim 10, wherein the Hetrophelic Plate Count (HPC) of bacteria is reduced by about 100%, as measured by Idexx Technique in the form of MPN.

12. The process of claim 9, wherein the concentration of biodegradable organic materials is reduced by at least about 72%, as measured by BOD.

13. The process of claim 12, wherein the concentration of biodegradable organic materials is reduced by at least about 75%, as measured by BOD.

14. The process of claim 13, wherein the concentration of biodegradable organic materials is reduced by at least about 83%, as measured by BOD.

15. A process for reducing pollutants in wastewater, comprising aerating and mixing wastewater containing organic and/or inorganic chemical pollutants and bentonite clay in a vessel at a first temperature and for a time sufficient to reduce the concentration of said pollutants, raising the temperature of said mixture to at least 100 ° C. to evaporate water vapor, passing said water vapor through a fritted membrane and into a condenser; and collecting condensed water, wherein the concentration of said organic and/or inorganic chemical pollutants is reduced by at least about 42%, as measured by COD.

16. The process of claim 15, wherein the concentration of said organic and/or inorganic chemical pollutants is reduced by at least about 78%, as measured by COD.

17. The process of claim 16, wherein the concentration of said organic and/or inorganic chemical pollutants is reduced by at least about 93%, as measured by COD.

18. The process of claim 15, wherein the concentration of total organic carbons (TOC) is reduced by at least about 95%.

* * * * *